United States Patent
El-Agha et al.

(10) Patent No.: US 8,144,802 B2
(45) Date of Patent: Mar. 27, 2012

(54) DIGITAL DATA ENCODING AND DECODING METHOD AND SYSTEM

(75) Inventors: Alaa El-Agha, Waterloo (CA); Dustin Griesdorf, Waterloo (CA)

(73) Assignee: Semiconductor Components Industries, LLC, Phoenix, AZ (US)

( * ) Notice: Subject to any disclaimer, the term of this patent is extended or adjusted under 35 U.S.C. 154(b) by 1085 days.

(21) Appl. No.: 12/027,703

(22) Filed: Feb. 7, 2008

(65) Prior Publication Data
US 2009/0097588 A1 Apr. 16, 2009

Related U.S. Application Data

(60) Provisional application No. 60/980,242, filed on Oct. 16, 2007.

(51) Int. Cl.
- *H04L 27/10* (2006.01)
- *H04L 7/02* (2006.01)
- *H04B 14/04* (2006.01)
- *H03M 5/14* (2006.01)
- *H04M 7/12* (2006.01)

(52) U.S. Cl. ........ 375/282; 375/242; 375/333; 375/361; 341/70; 341/72

(58) Field of Classification Search .................. 375/241, 375/242, 253, 333, 337, 360, 361, 363, 262, 375/265, 282, 340, 341, 368; 341/68–73, 341/143
See application file for complete search history.

(56) References Cited

U.S. PATENT DOCUMENTS

| | | | |
|---|---|---|---|
| 3,108,261 A | 10/1963 | Miller | |
| 4,124,778 A | 11/1978 | Amass | |
| 4,437,086 A * | 3/1984 | Miller et al. | ..................... 341/58 |
| 4,963,868 A | 10/1990 | Takayama et al. | |
| 5,696,800 A * | 12/1997 | Berger | ........................... 375/361 |
| 5,805,632 A * | 9/1998 | Leger | ............................. 375/282 |
| 6,437,710 B1 | 8/2002 | Tam et al. | |
| 6,449,315 B2 * | 9/2002 | Richards | ....................... 375/282 |
| 7,634,694 B2 | 12/2009 | Green et al. | |
| 7,702,405 B2 | 4/2010 | Hetzel et al. | |
| 2004/0161113 A1* | 8/2004 | Coene et al. | .................. 380/287 |
| 2005/0271068 A1 | 12/2005 | Hetzel | |
| 2006/0083328 A1 | 4/2006 | Green et al. | |
| 2010/0135309 A1 | 6/2010 | Hetzel et al. | |

FOREIGN PATENT DOCUMENTS

| | | |
|---|---|---|
| EP | 0318227 | 5/1989 |
| EP | 1603284 | 12/2005 |
| EP | 1648128 | 4/2006 |
| WO | 9723071 | 6/1997 |

* cited by examiner

*Primary Examiner* — Young T. Tse
(74) *Attorney, Agent, or Firm* — Pearne & Gordon LLP

(57) ABSTRACT

Digital data encoding and decoding method and system is provided. The data encoding includes encoding a frame signal into a bit stream, including detecting a specific bit pattern in the bit stream when the frame signal is present, generating a control signal in respect to the specific bit pattern, and encoding the bit stream into one or more marks and one or more spaces so that encoded data include a unique encoding pattern for the frame signal. The data decoding includes detecting at least one of mark and space from encoded data, recovering a bit stream from the encoded data when the at least one of mark and space is present, detecting a specific bit pattern associating with a frame signal from the encoded data when the at least one of mark and space is present, and recovering the frame signal from the encoded data.

24 Claims, 12 Drawing Sheets

DIGITAL DATA ENCODING AND DECODING METHOD AND SYSTEM

FIELD OF INVENTION

The present invention relates to digital data processing, more specifically to a method and system for encoding and decoding the digital data.

BACKGROUND OF THE INVENTION

Wireless communications devices have been developed for a wide variety of applications. A hearing instrument, such as a wireless digital hearing aid (WDHA) or listening device to assist with hearing, is one of the devices.

The WDHA may include circuitry for audio input and output, a digital signal processor (DSP), one or more signal co-processors, non-volatile storage, analog radio frequency (RF) circuitry for RF transmission and reception, and circuitry for baseband digital coding and modulation and demodulation. These components may be implemented on the WDHA in one or more integrated circuits (ICs).

The signal flow of a WDHA transmitter is as follows: An audio signal is received through an electrical transceiver and connected to the analog circuits to convert the analog audio signal into a digital signal. The digital signal is stored in temporary RAM on the WDHA. Through a combination of software-based and hardware-based processing the digital signal is processed and passed to the analog RF circuitry for RF transmission.

The signal flow of a WDHA receiver is as follows: The analog RF circuitry receives an RF transmission and converts the signal to a digital baseband signal. The digital signal is processed through a combination of software-based and hardware-based processing. The digital signal may be combined with other digital signals sourced from electrical transceivers on the receiver. The digital signal is then passed to the analog circuits to convert to an analog signal. An electrical transducer converts the analog signal into sound energy for the WDHA user.

In the processing stages of the transmitter and receiver the WDHA may manipulate the signals in a number of ways to compensate for a WDHA user's hearing loss profile. This may include processing on the local signals as well as on transmitted or received signals.

A WDHA system may consist of two WDHAs. One WDHA is designated as a transmitter. The other WDHA is designated as the receiver. The transmitter may transmit audio data or other data to the receiver. The transmitted data, including audio data, may have been previously processed or compressed according to the bandwidth limitations of the wireless radio link (RF link). On the receiver the received data may be further processed and subsequently mixed with local audio data to generate the final outgoing audio signal for the WDHA user. Non-audio data may be used for control purposes.

Another WDHA system may include a non-hearing aid based transmitter and a receiving WDHA. The transmitter may be stationary (fixed) or portable. The transmitter in this case may be connected to some other stationary or portable audio device such as a music player, computer, or television. The transmitted data, including audio data, may be pre-processed or compressed according to the bandwidth limitations of the wireless radio link. On the receiver the received data may be further processed, including decompression, and subsequently mixed with local audio data to generate the final outgoing audio signal for the hearing aid user. Non-audio data may be used for control purposes, such as volume control or program selection.

In order to provide sufficient or better audio quality to the WDHA user, there must be enough bandwidth available on the wireless radio link to send the audio signal with minimal distortion and minimal noise. Also, since the WDHA must operate on a battery with limited voltage and current capabilities, the wireless radio link must operate using minimal power to maximize battery life. Due to these two opposite requirements, a tradeoff must be made between bandwidth and power consumption. Thus the audio signal quality is a function of the available bandwidth and increased bandwidth leads to decreased battery performance.

In addition to battery performance requirements, available bandwidth may be limited by regulatory limitations and physical antenna size limitations.

In order to maximize the audio quality of the WDHA the bandwidth allocated to audio data over the wireless radio link must be maximized.

Digital data to be transmitted includes sequences of digital bits (1's and 0's). Together the digital bits form blocks of digital data that are interpreted as values on the receiver of the wireless digital hearing aid. In order for the received data to be meaningful it requires a bit reference (referred to herein as a bit clock) and frame reference (referred to herein as a frame signal). The bit clock edges are ideally synchronized with the bit boundaries and can thus be used to extract the value of each individual bit. The frame signal is ideally synchronized with the frame boundaries and can thus be used to extract the bits associated with each frame. By using the bit reference and the frame signal, the receiving hearing aid is able to interpret the incoming data stream as frames of data. Data streams without a corresponding bit clock or frame signal cannot be properly interpreted.

In ideal wired communication systems the bit clock is transmitted in parallel with the data. This method provides the best synchronization between the data and clock but requires twice the bandwidth of the data alone because both need to be transmitted and received simultaneously. In order to reduce the bandwidth requirements for digital storage systems or wired communication systems coding techniques are used to embed the bit clock into the data signal. One such coding technique is known as Miller coding (U.S. Pat. No. 3,108,261 to Miller). Similar coding techniques may be used in wireless systems.

Further, in ideal wired communication systems the frame signal is transmitted in parallel with the data. This method provides the best synchronization between the data and the frame signal but requires twice the bandwidth of the data alone.

A typical alternative to transmitting the frame signal in parallel with the data is to create the frame signal on the receiver based on the incoming data. A technique for doing this is as follows: The transmitter inserts a known sequence of bits into the data stream to signify the start (or end) of a frame. The sequence occurs either at a predetermined location in the data stream or at some other place in the data stream that both the transmitter and receiver agree upon. When the sequence occurs at the start of the frame it is commonly referred to as a preamble. For the purposes of this discussion the known sequence occurring anywhere in the sequence is referred to as the preamble.

When using the preamble, the receiver must continually scan the incoming data stream for the preamble. Once the preamble is received the receiver can establish a reference.

The preamble technique is effective but has many limitations. The transmitter must ensure that the preamble does not occur in the regular data stream. Increasing the length of the preamble minimizes the probability of such an occurrence. A longer preamble will reduce the bandwidth available for the audio signal. Further, the transmitter may monitor the regular data stream and if the stream contains the preamble, it may modify it or add an escape sequence to prevent the receiver from detecting a preamble when it shouldn't.

In a WDHA the transmitter and receiver operate using different clocks. Therefore, since the bit clock frequency may drift over time the preamble must be sent periodically to properly synchronize the frame signal on the receiver. Since the preamble is inserted in the data stream, the space allocated to the preamble may not be used for other purposes such as audio data. Further, in a synchronous audio system with a fixed audio data rate the audio data stream may not be interrupted. If the data stream is interrupted, the audio data becomes non-continuous and results in a noticeable audio artifact that is heard by the hearing aid user. Such an artifact is undesirable. Typically, to avoid interruptions due to the necessary preamble, each data frame will contain the preamble or otherwise allocate space for the preamble that may not be used for regular audio data. In other words, the bandwidth required between the two systems will be higher than the net throughput once the preamble has been removed. Thus, the preamble uses valuable bandwidth that may otherwise be used for payload data such as audio. This causes the audio quality to be degraded compared to a signal with no preamble.

SUMMARY OF THE INVENTION

It is an object of the invention to provide a method and system that obviates or mitigates at least one of the disadvantages of existing systems.

According to an aspect of the present invention there is provided a method for digital data communication, which include encoding bit stream having monitoring a specific bit pattern in the bit stream when a frame signal is received, and based on the monitoring, creating a unique encoding pattern for the frame signal in encoded data.

According to another aspect of the present invention there is provided a system for digital data communication, which includes an encoder having a control unit for monitoring incoming bit stream to detect a specific bit pattern at a bit position relative to a frame signal and asserting a control signal, and a mark and space unit for generating encoded data having at least one of one or more marks and one or more spaces, based on the bit stream in response to the control signal so that the frame signal is embedded into the encoded data.

According to a further aspect of the present invention there is provided a method for decoding. The method includes recovering bit stream from encoded data. The encoded data is generated using a unique encoding pattern for a frame signal in the encoded data. The recovering includes detecting at least one of mark and space. The method includes recovering a frame signal from the encoded data, including detecting a pattern associated with the unique encoding pattern based on the detection of the at least one of mark and space.

According to a further aspect of the present invention there is provided a system for decoding. The system includes a first recover for recovering bit stream from encoded data. The encoded data is generated using a unique encoding pattern for a frame signal in the encoded data. The first recover includes a circuit for detecting at least one of mark and space. The system includes a second recover for recovering a frame signal from the encoded data. The second recover includes a circuit for detecting a pattern associated with the unique encoding pattern based on the detection of the at least one of mark and space.

BRIEF DESCRIPTION OF THE DRAWINGS

These and other features of the invention will become more apparent from the following description in which reference is made to the appended drawings wherein.

DETAILED DESCRIPTION

Figure 1:
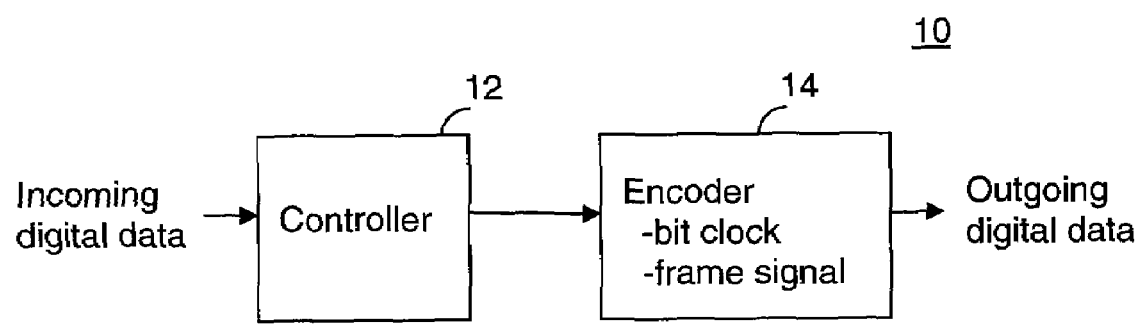
FIG. 1 is a block diagram illustrating a data encoding circuit in accordance with an embodiment of the present invention.

Embodiments of the present invention are described using a transmitting device for transmitting digital data and a receiving device for receiving the digital data. The embodiments of the present invention provide encoding methods and systems for properly and efficiently establishing frames within the received data. The embodiments of the present invention provide decoding methods and systems for properly recovering the frame signal in the encoded data from the transmitter.

The methods and systems in accordance with the embodiments of the present invention are applicable to wired or wireless communications for digital data, e.g., a communications link where the bandwidth may be limited and it is desired to maximize payload data vs overhead. The methods and systems maximize the bandwidth allocation to payload data by reducing the overhead to zero or near zero. The digital data may be, for example, but not limited to, audio data from a WDHA, listening device or some other broadcasting device. In the description below, the broadcasting device is referred to as a transmitter. However, it is well understood by one of ordinary skilled in the art that the transmitter is not limited to the broadcasting device. The receiving device may be, for example, but not limited to, another wireless digital hearing aid or listening device. In the description below, the receiving device is referred to as a receiver.

Miller encoding is a return-to-zero (RZ) coding method. It is used to encode a non-return-to-zero (NRZ) data signal. The clock and data are combined into a single digital data stream. The Miller encoding rules are as follows: For a "1", generate a center bit transition (referred to herein as a mark). For a "0", do not generate a center bit transition (referred to herein as a space). If the previous bit was a "0", generate a transition on the leading edge of the bit (Standard Miller Encoding in the figures). It is noted that in the figures "Standard Miller Encoding" represents the result of the Standard Miller Encoding and is shown to compare it with the embodiments below.

On the receiver, a data bit "1" is generated when a mark is detected. A data bit "0" is generated when a space is detected. In this way the transmitted signal may be recovered.

Miller encoding guarantees a number of transitions in the data stream that may be used to create a recovered bit clock. However, with Miller encoding the phase of the clock used for encoding is lost. Thus, the receiver must also recover the clock phase information. One particular NRZ bit pattern, "101" (PHE pattern), generates a unique Miller encoding waveform. If the clock on the receiver is properly phased, the data is correctly detected as mark, space, mark, and recovered as "101". If the clock on the receiver is out of phase, the data is incorrectly detected, for example, as space, space, with no leading edge transition. A space is interpreted as a "0". Since no proper Miller encoded data may contain two spaces without a leading edge transition, this sequence is considered a coding violation (referred to herein as a phase error, or PHE).

A Miller decoder is a circuit designed to detect the marks and spaces created by the Miller encoder. The Miller decoder must also generate a properly phased clock. To recover the clock the Miller decoder must establish a clock signal that is locked to the transitions in the Miller encoded data.

To establish the proper phase of the recovered clock the Miller decoder analyzes the incoming data and detects PHEs. In the conventional systems, a PHE indicates that the clock used for decoding is out of phase. In order for a PHE to be generated with the standard Miller encoding technique the original NRZ data must contain the particular NRZ bit pattern "101".

The standard Miller encoder does not intentionally generate PHEs, however, it may generate them in a way that solely depends on the data, i.e., a PHE may never occur if the data is of a certain type.

FIG. 1 is a block diagram illustrating a data encoding circuit in accordance with an embodiment of the present invention. The data encoding circuit 10 of FIG. 1 is in a transmitter. The data encoding circuit 10 includes a controller 12 and an encoder 14. Using the controller 12 and the encoder 14, a frame signal (frame synchronization signal) is encoded into a digital data stream with minimal overhead.

The controller 12 analyzes the data to be transmitted for a particular bit pattern (referred to as a frame sequence) and makes a decision whether to generate a PHE associated with a frame signal. The decision is made based on, for example, the detection of the frame sequence, frame signal, and the current state of the circuit (for example, the state of the controller 12).

The encoder 14 implements encoding operation through which a PHE is forced at a certain bit stream location and for a certain duration, representing the frame signal for a receiver. The frame signal is embedded into the encoded signal through the PHE. The encoder 14 implements, for example, Miller encoding rules, however, is modified to force the PHE based on the control from the controller 12. The receiver detects the PHE in the received data, which corresponds to the frame signal. The receiver doesn't detect the frame signal directly.

For example, inhibiting the required transition between two consecutive spaces generates the PHE. The receiver detects the two consecutive spaces without an intermediate transition, representing a PHE.

The encoding circuit 10 takes an original data stream which includes a series of 1's and 0's. The original data may be random. The encoding circuit 10 creates a unique encoding pattern that does not change the original data when decoded or otherwise does not change the original data in a way that can not be undone by a decoder with no prior knowledge of the data contents.

Once encoded, the data stream will be different than the original data and it is unique since it is dependent and deterministic. Further, the encoded data contains the frame signal. When the receiver decodes the data, the original series of 1's and 0's is restored. However, the receiver may employ some further processing such as inversion etc, to restore the original data. Any further processing required to restore the original data is compatible with any original data stream (i.e., no prior knowledge required).

Figure 2:
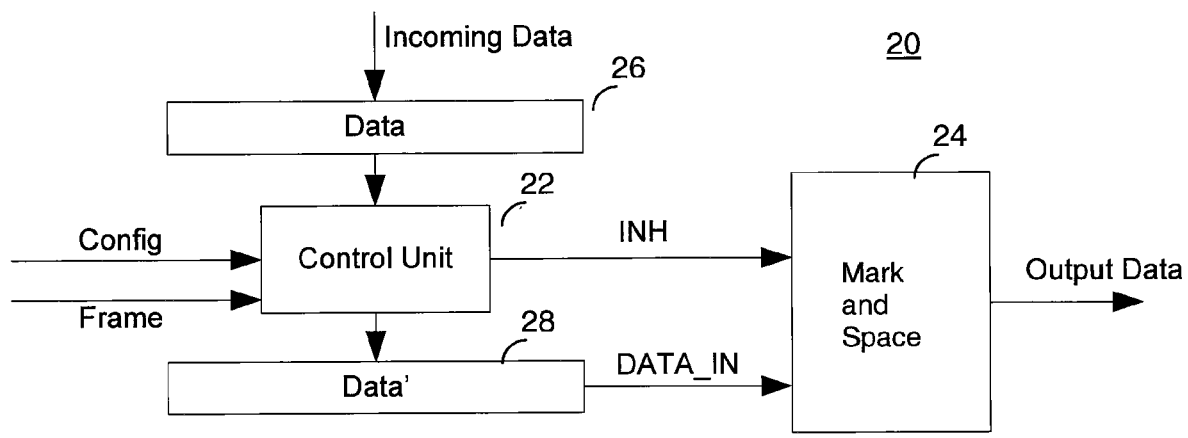
FIG. 2 is a block diagram illustrating an example of the encoding circuit of FIG. 1.

FIG. 2 is a diagram illustrating an example of the encoding circuit 10 of FIG. 1. The encoding circuit 20 of FIG. 2 includes a control unit 22 and a mark and space unit 24. The control unit 22 corresponds to the controller 12 of FIG. 1. The mark and space unit 24 corresponds to the encoder 14 of FIG. 1, and includes a modified Miller encoder and outputs encoded signals based on the Miller encoding rules and an input control signal (INH) from the control unit 22. In FIG. 2, incoming data is stored in a shift register 26 (Data). However, the incoming data may be provided to the control unit 22 without using the shift register 26.

The control unit 22 receives at its inputs configuration data ("Config" in FIG. 2), a frame signal (Frame) and the output from the shift register 26. "Config" refers to signals used to configure the control unit 22. For example, the values used in the state diagram in FIG. 5 may be configured via "Config". "Config" may be control lines or other communication signals used to configure the control unit 22.

The control unit 22 monitors the incoming data stream to detect a specific frame sequence at a particular bit position relative to the frame signal. The control unit 22 analyzes several bits in the shift register 26 for the frame sequence. Based on the control unit state as described below, the control unit 22 asserts an inhibiting (INH) signal to the mark and space unit 24.

If the frame sequence does not exist, the control unit 22 may decide to modify the bit stream to contain the frame sequence, resulting in a bit error and subsequently a PHE after asserting the INH signal. The bit stream is modified with a low enough frequency not to affect net system performance. The control unit 22 modifies the bit streams depending on its state and configuration. For example, if the frame sequence has not occurred within some number of frames, the control unit 22 may decide to modify the frame to force it to contain the frame sequence. The control unit 22 may wait until it only has to modify 1 bit. The modification may be implemented by, for example, inline modification so that the length of the bit stream is unchanged or adding one or more bits to force the bit stream to contain the frame sequence. The mechanism for modifying the data may be configurable not to modify the data. If the frame sequence exists the control unit 22 outputs the data without modification. The control unit 22 does not have to insert any sequence into the data stream, as it would with a preamble type design. The modified frame of data or unmodified frame of data output from the control unit 22 is stored in a shift register 28 (Data').

The specific implementation of the state mechanism for the operation of the control unit 22 may vary and several alternatives may be used (i.e., counter, state machine, microcontroller). The state mechanism may be, for example but not limited to, in the control unit 22 of FIG. 2. In one example, the state mechanism is implemented by a counter as described below.

The output of the shift register 28 is a source data (DATA_IN) used for the mark and space unit 24. In the mark and space unit 24, the clock and data are combined into a single digital data stream. The mark and space unit 24 generates an encoded signal containing the data, embedded clock and embedded frame signal (Output data). For simplicity, several signals, such as the clock, are not shown in the figures. A technique of embedding clock is well understood by one of ordinal skill in the art.

In one embodiment, the frame sequence is n bits long (n: integer) and the number of independent frame signals to encode is n−1. In one example, the frame sequence is 2 bits long (e.g., "00") and the number of frame signals to encode is 1. In another example, the frame sequence is 3 bits long (e.g., "000") and the number of frame signals to encode is 2.

In one embodiment, the frame sequence is configurable and may be any combination of bits. In one example, the frame sequence is two sequential zeros, "00" (referred to as "00" pattern).

For example, with n bits the system always outputs n bits, resulting in no overhead. Generally the control unit 22 may be configured such that it does not have to modify the data stream since the "00" pattern will appear in random data with 25% probability (75% probability of it not occurring for a single frame). The probability is 0.75*0.75=56.25% of it not occurring for two frames in a row. The probability is $0.75^n$ of it not occurring for n frames in a row. For example, with n=32, the probability of the "00" pattern not occurring in all preceding 32 frames at the correct position is 1.004e−4. Assuming that the frame length is 128 bits, and if the control unit 22 is configured to force a bit error after 32 frames, it will effectively induce a bit error at a maximum rate of 1 per 1,274,235 bits (i.e. less than 1 bit error per megabit) which is well within the performance limits for a WDHA. WDHA is generally tolerable to around 1 bit error per 1000 bits.

Figure 3:
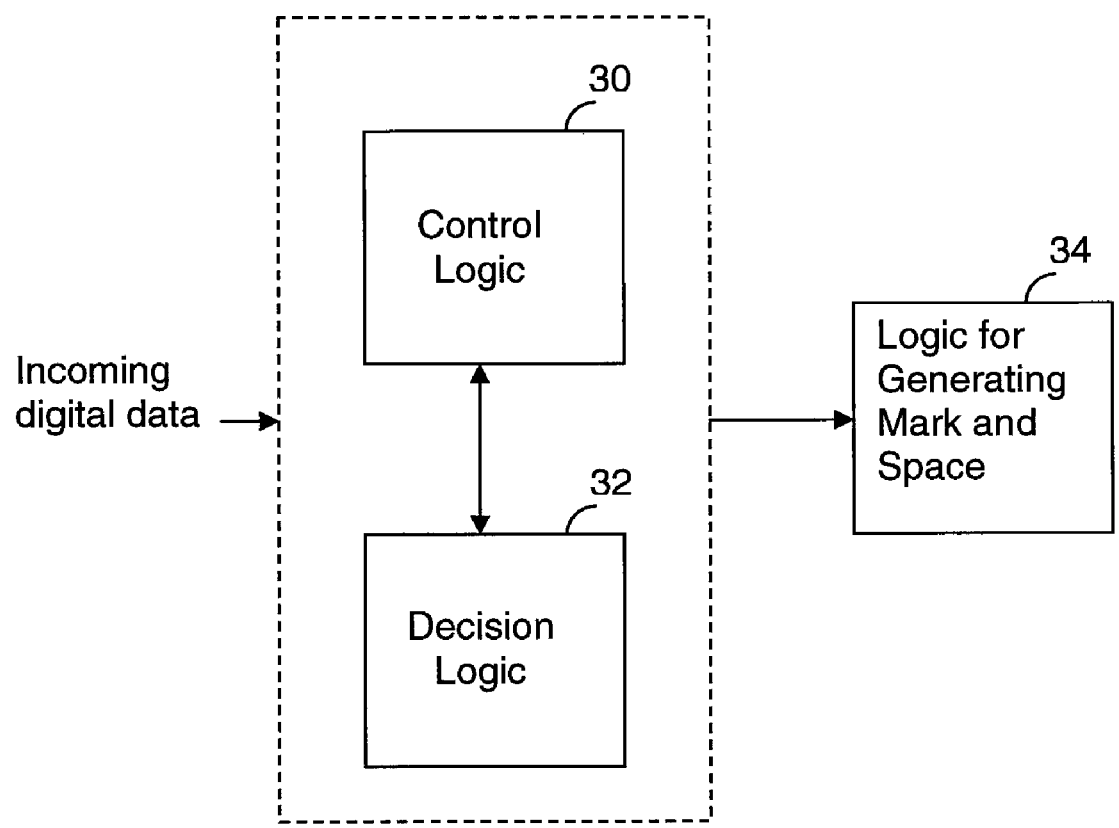
FIG. 3 is a block diagram illustrating an example of logic blocks applicable to the circuits of FIG. 2.

FIG. 3 is a block diagram illustrating an example of logic blocks applicable to the circuit of FIG. 2. The decision logic 32 of FIG. 3 scans (monitors) the incoming data stream and decides whether or not to generate the INH signal required to force a PHE to be generated on the output data stream (e.g., Blocks 60, 62, 64 of FIG. 5). The control logic 30 of FIG. 3 monitors whether or not the INH signal was generated, and decides whether or not to modify the bit stream to force the frame sequence to be generated, based on its current state (e.g., Blocks 68, 70, 72, and 66 of FIG. 5). The control logic block 30 of FIG. 3 is executed once for each data frame and is synchronous with the frame signal. The control and decision logic blocks are in the control unit 22 of FIG. 2. The generating logic 34 of FIG. 3 outputs marks and spaces according to the received data DATA_IN and the INH signal from the control unit 22. The generating logic 34 is in the mark and space unit 24.

The decision logic block 32 observes the incoming data stream to detect a specific frame sequence at a particular bit position relative to the frame signal. The actual bit position may remain constant through the operation and may be at the beginning or end of the data frame. The data frame may be pre-encoded or interleaved, such as adding ECC parity bits or other forward correcting or protocol data.

It is assumed that the frame sequence is the "00" pattern. If the "00" pattern is present the generating logic 34 forces a PHE by suppressing the transition between the two generated spaces. This is accomplished by asserting an inhibit signal (INH). If the "00" pattern is not present a further decision based on the state and configuration of the control unit 22 of FIG. 2 is implemented (e.g., FIG. 5 for the state logic).

The control unit 22 of FIG. 2 may be configured to force the data stream to contain the required "00" pattern by toggling either 1 or 2 bits at the proper location with some minimum frequency. The minimum frequency may be set to never in which case the encoder is configured never to toggle bits in the incoming data stream.

Figure 4:
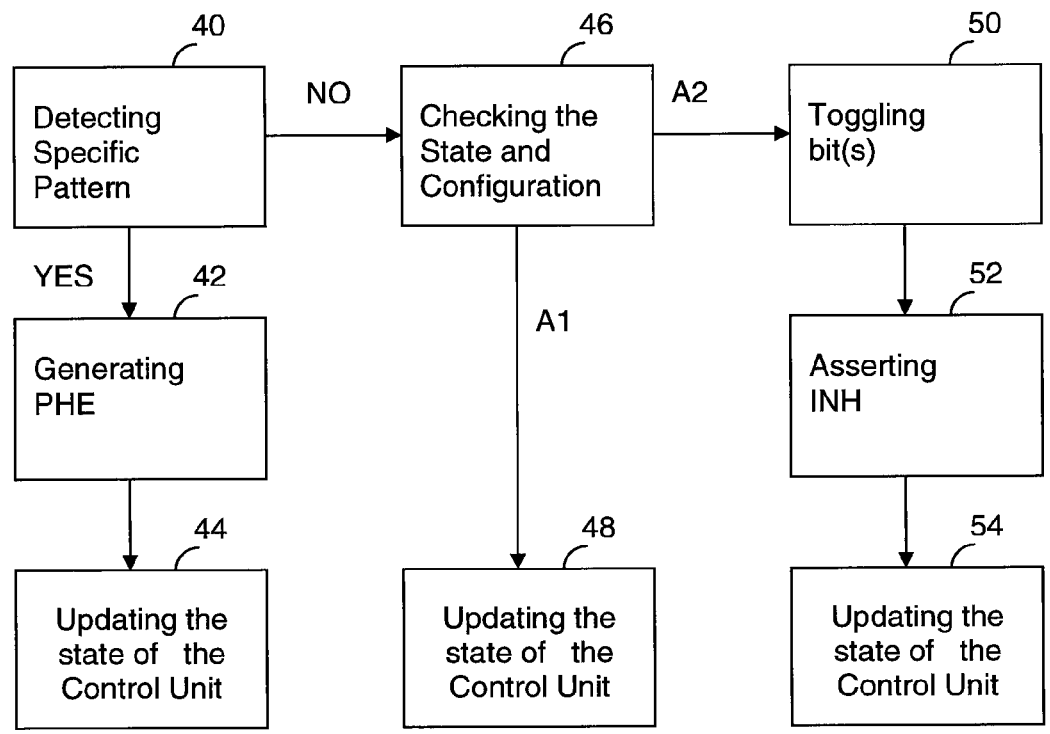
FIG. 4 is a flow diagram illustrating an example of operation for the control unit of FIG. 2.

FIG. 4 is a flow diagram illustrating an example of operation for the control unit 22 of FIG. 2. Referring to FIGS. 2 and 4, when the control unit 22 detects the "00" pattern (40) and generates the required PHE (42), the state of the control unit 22 is updated (44) to indicate that a PHE has been generated for the latest frame. When the control unit 22 does not detect the "00" pattern, and if the configuration and state indicate that the control unit 22 should not toggle bits to force the "00" pattern (46, A1), the circuit state is updated (48) to indicate that no PHE has been generated for the frame. If the control unit 22 does not detect the "00" pattern, and the state had reached some value specified in the configuration during the previous frame (46, A2), the control unit 22 toggles either 1 or 2 bits (50) as required to force the data to contain the "00" pattern, and subsequently asserts the required control signal (INH) (52) to generate the required PHE. Also, the state is updated (54) to indicate that a PHE has been generated for the latest frame.

In one embodiment, the state of the control unit 22 is stored with a counter, n, representing the number of frames that have passed without a suitable "00" pattern detected. In this case, the counter may be reset (set to 0) when the PHE is generated (42). When no PHE has been generated for the frame, the state is updated (48) by updating the counter, n, to n+1. If the control unit 22 does not detect the "00" pattern, and the counter n had reached some value specified in the configuration during the previous frame (46, A2), the control unit 22 toggles either 1 or 2 bits (50). When the PHE has been generated for the latest frame, the state is updated (54) by resetting the counter n to 0. The state may be stored by some other method besides a counter.

The control unit 22 may also be configured such that when the counter n reaches its maximum value the encoding circuit is limited to only toggle a single bit (or, if the frame sequence is 'j' bits long, the circuit may be limited to only toggle 'j-k' bits, where j and k are integers). For example, it is assumed that the frame sequence is the "00" pattern. In this state the control unit 22 waits until at least one of the two bits is already zero before forcing the other bit to zero, or alternatively the "00" pattern may occur naturally in this state. When the frame sequence is one other than the "00" pattern, the bit(s) may be forced to a one.

Figure 5:
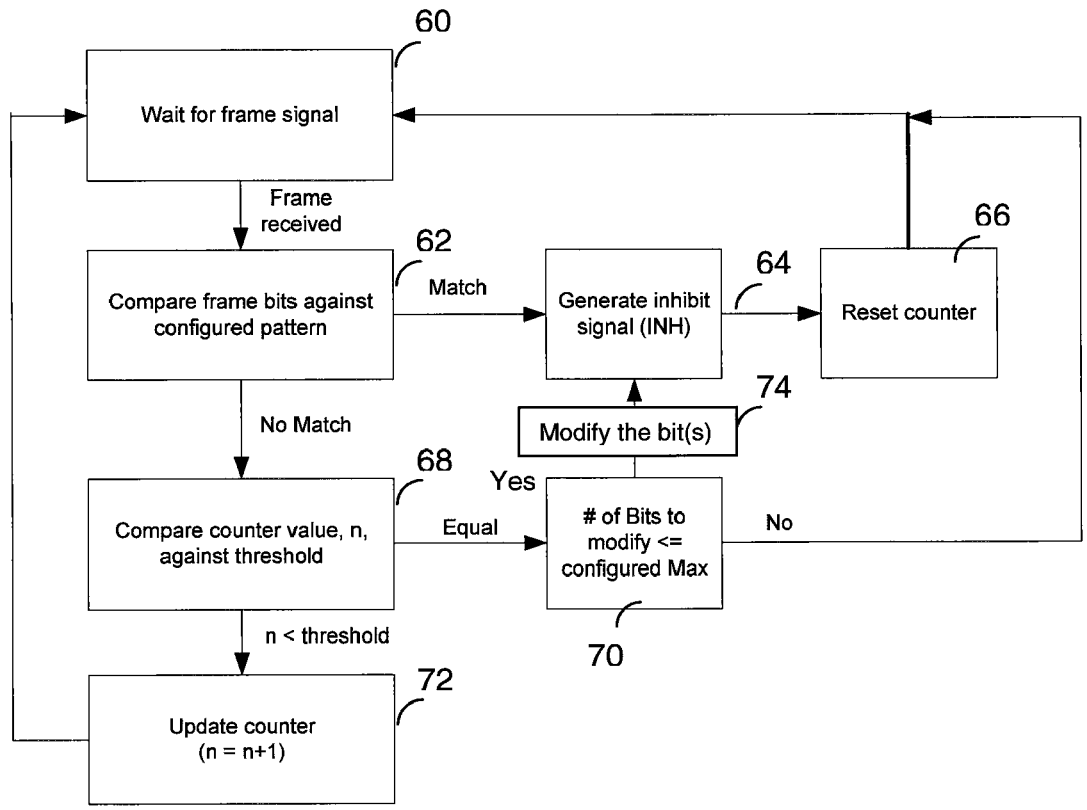
FIG. 5 is a diagram illustrating an example of a state logic in the control unit of FIG. 2.

FIG. 5 is a state diagram illustrating an example of a state logic for the control unit 22 of FIG. 2. In FIG. 5, a counter is used as a state machine indicating the state of the control unit 22 of FIG. 2. Referring to FIGS. 2 and 5, the initial state is waiting for the frame signal (60). Once the frame signal is received, several bits in the data are compared against the frame sequence (in the embodiment above, the sequence is the "00" pattern) (62). If a match is detected, the INH signal is generated (64). A counter is reset (66) and the state machine reverts back to the initial state (60). If no match is detected, the current counter value, n, is compared against a configured threshold value (68). If the counter is equal to the threshold, the control logic checks if the number of bits required to be modified to create the required frame sequence is less than or equal to the maximum number configured (70). If the number of bits to be modified is less than or equal to the maximum number configured (yes), the bit or bits are modified (74) and the INH signal is generated (64). If not, the state machine reverts back to the initial state (60). Furthermore, if the current counter is less than the threshold when the frame sequence is not detected, the counter is updated to the current value plus 1 (72), and the state machine reverts back to the initial state (60).

Figure 6:
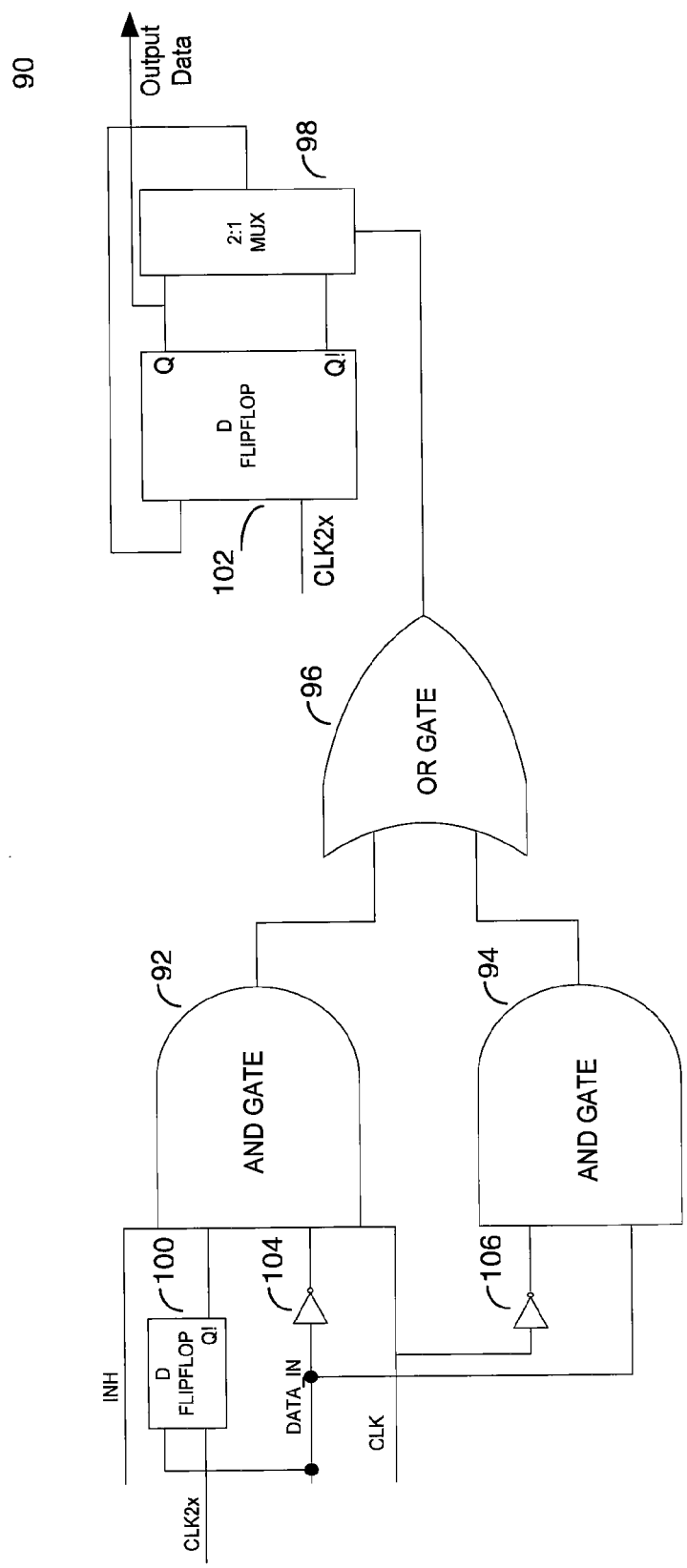
FIG. 6 is a diagram illustrating an example of the mark and space unit of FIG. 2.
Figure 7:
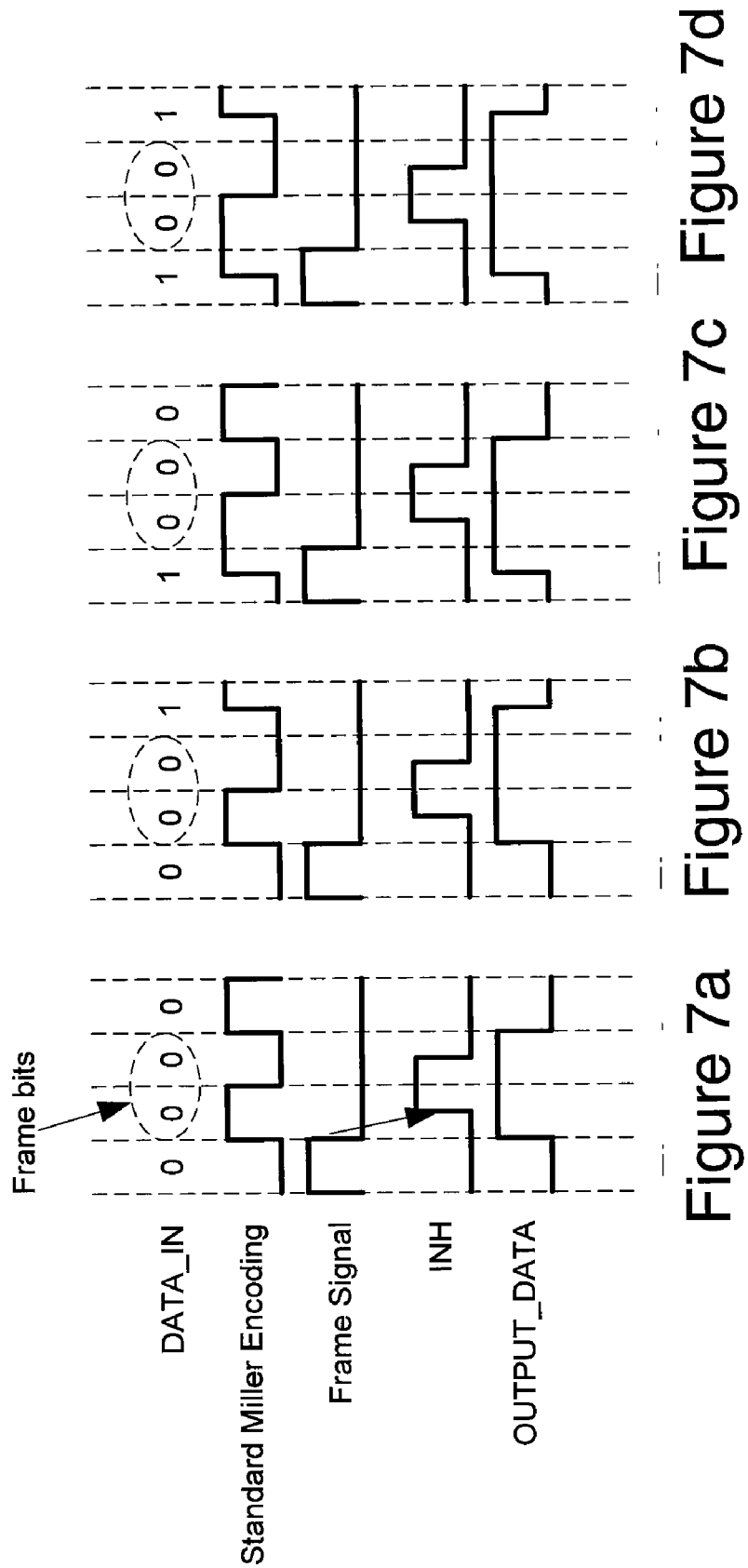
FIGS. 7*a*-7*d* are waveform timing diagrams illustrating examples of four different NRZ bit patterns.

FIG. 6 is a diagram illustrating an example of the mark and space unit 24 of FIG. 2. The implementation is synchronous to a system clock CLK2X. CLK2X is a clock signal at twice the data rate. CLK is a clock signal generated from CLK2X divided by 2. The data input, DATA_IN is synchronous to CLK. The circuit 90 of FIG. 6 is an example of the circuit 24 of FIG. 2 and includes two AND gates (one 4-input AND gate, one 2-input AND gate) 92 and 94, a 2-input OR gate 96, a 2:1 MUX 98, and two D flipflops 100 and 102.

The D flipflop 100 is sensitive to CLK2X and is used to store the current value of DATA_IN. Thus, the output of the D flipflop 100 is the DATA_IN signal on the previous CLK2X rising edge. The output of the AND gate 92 is the logical AND of the INH signal (generated from the control unit) the previous DATA_IN value (output of the D flipflop 100), the inverse (104) of DATA_IN, and CLK. The output of the second AND gate 94 is the logical AND of DATA_IN and the inverse (106) of the CLK signal. The output of the OR gate 96 is the logical OR of the output of the two AND gates 92 and 94. The output of the OR gate 96 controls the 2:1 MUX 98. The MUX 98 selects the input to the D flipflop 102. The D flipflop 102 is sensitive to CLK2X. The input is either the Q output of the D flipflop 102 or the inverse (Q!) output of the D flipflop 102. When the input is selected to be Q, the output of the encoder 90 does not change. This occurs when neither of the two logical AND algorithms is true. When the input is selected to be Q!, the output of the encoder 90 toggles. This occurs when either of the logical AND algorithms is true. The output of the encoder 90 is the Q signal from the D flipflop 102.

FIGS. 7a-7d are waveform timing diagrams illustrating examples of four different NRZ bit patterns (0000, 0001, 1000, 1001). The NRZ bit pattern, DATA_IN is shown on the first line. Each bit pattern has the required frame sequence "00" in the proper position relative to the frame signal. The second line shows a standard Miller encoding waveform of the respective NRZ bit pattern. The third line shows the frame signal relative to the NRZ data and frame bits. The fourth line shows the INH generated from the control unit 22 of FIG. 2 based on the frame bits and frame signal. The fifth line shows the final output of the circuit 24 of FIG. 2 whereby the transition between the two spaces for the "00" pattern is inhibited due to the INH signal and the encoding logic.

The examples of FIGS. 7a-7d demonstrate that the encoding circuit properly encodes the frame signal into the data stream when the required frame sequence (i.e., the "00" pattern in this case) is bracketed by any combination of two bits (00, 01, 10, and 11).

The encoding circuits of the above embodiments may be in the transmitter of a WDHA. The encoding circuits may relate to a circuitry involved in the baseband processing for the RF portions of the WDHA.

It is well understood by one of ordinary skill in the art that the above embodiments are equally valid for a Miller encoder where the rules are inversed: a 0 generates a mark, and a 1 generates a space. In this configuration, the encoding circuit may scan for a pattern of two sequential 1's (11).

With the above encoding method the frame signal becomes embedded in the encoded signal through a PHE. Generally, no bandwidth overhead is required compared to the alternate frame signal methods. The encoding circuit is, for example, for use with random audio data where the "00" pattern may generally occur with the required regularity for the receiver to establish the frame signal. The "required regularity" is dependent on the system performance requirements. Specially, the regularity will dictate the latency of the receiver to establish the frame signal. There may be some probability involved. The control unit 22 of FIG. 2 is configurable depending on the performance requirements. The required regularity may be dictated by the requirements of the receiver/decoder. A more lax decoder will be more tolerant when frames do not have a PHE signal, but will take longer to establish an initial frame signal. A less lax decoder will be less tolerant when frames do not have a PHE signal, but will be able to establish a connection quicker. Specifically, the "00" pattern occurs at a certain timing after the frame signal with a probability of 0.25 in random data. However, for non-random audio data the circuit provides a method to force bits to 0 with some configurable periodicity to reduce the number of induced bit errors in the signal. Further, by including the functionality to configure the control unit 22 to only toggle a single bit (e.g., 74 of FIG. 5), the induced bit error rate may be reduced even further.

The methods and systems for decoding the previously encoded signal and recovering the frame signal are described in detail. The decoding method and system is on a receiver side. On the receiver the PHE signal may be interpreted either as an actual phase error due to the receiver clock being out of phase or as a frame signal. In a typical WDHA system where the data to be transferred is compressed audio data, the bit sequence "101" occurs randomly with some probability and some average frequency whereas the frame signal is periodic in nature. The receiver may receive many PHEs due to both the "101" pattern and the frame signal. The receiver includes a recover for recovering a NRZ signal and a recover for recovering a frame signal by detecting a PHE. The frame signal is generated based on the PHE.

In one embodiment, the receiver may employ a heuristic approach to extracting the periodic frame signal. In another embodiment, the receiver may contain a plurality of parallel Miller decoding circuits capable of detecting and counting PHEs over set number of bits.

Figure 8:
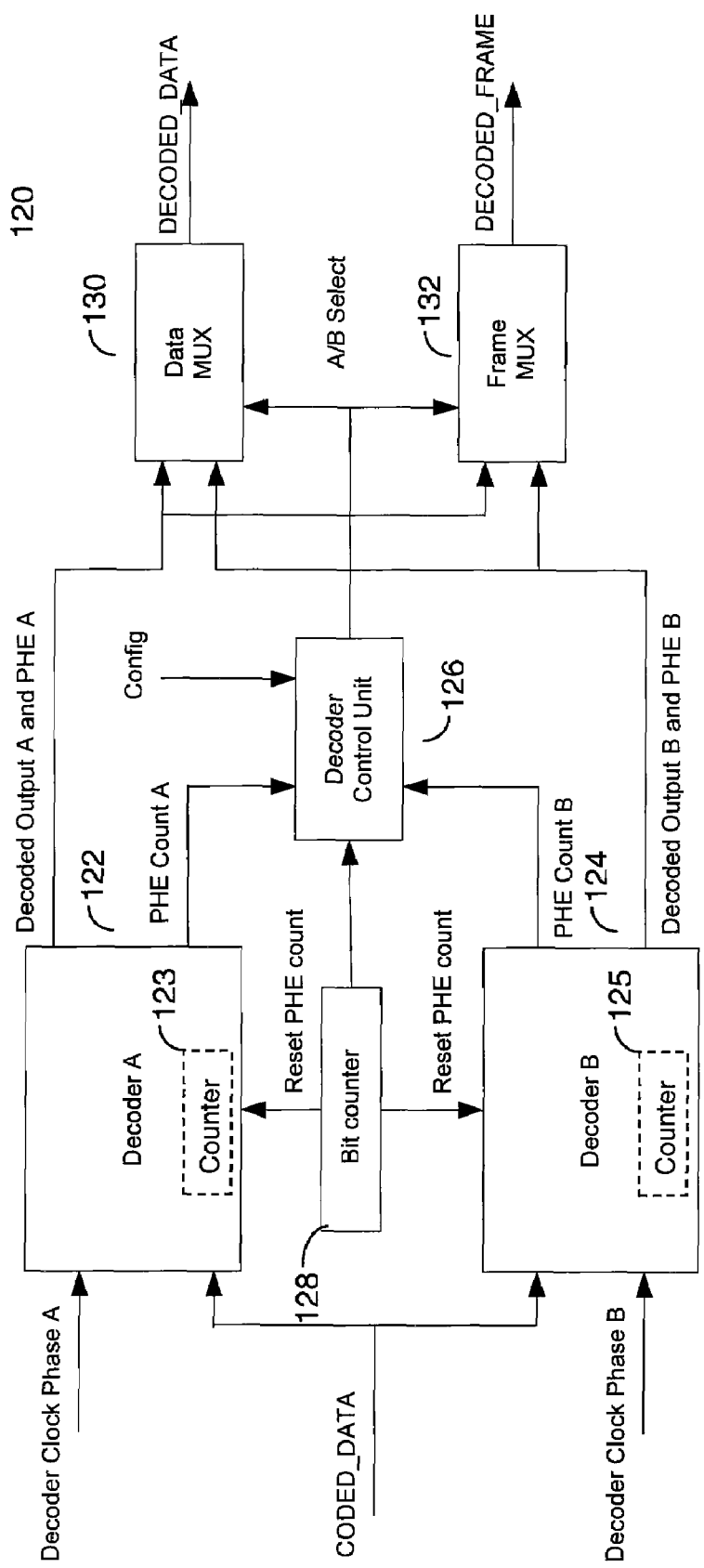
FIG. 8 is a block diagram illustrating an example of a decoding circuit in accordance with an embodiment of the present invention.

FIG. 8 is a diagram illustrating an example of a decoding circuit in accordance with an embodiment of the present invention. The decoding circuit 120 of FIG. 8 is in a receiver and includes a decoder A 122, a decoder B 124, and a decoder control unit 126. The decoder A 122 receives a decoder clock with phase A and coded data (CODED_DATA). The decoder B 124 receives a decoder clock with phase B and coded data (CODED_DATA). Each parallel decoder uses a clock ½ bit out of phase with each other. The decoder A 122 recovers the original NRZ data and detects a PHE. The decoder B 124 recovers the original NRZ data and detects a PHE. Each of the decoders 122 and 124 outputs decoded output synchronous to its clock. The control unit 126 determines (selects) the correct phase of the recovered clock.

"Decoded Output A" in FIG. 8 represents an output from the decoder A 122 due to detecting marks and spaces based on Decoder Clock Phase A. "Decoded Output B" in FIG. 8 represents an output from the decoder B 124 due to detecting marks and spaces based on Decoder Clock Phase B. "PHE A" in FIG. 8 represents a phase error signal when two spaces are detected without an intermediate transition, using Decoder Clock Phase A. "PHE B" in FIG. 8 represents a phase error signal when two spaces are detected without an intermediate transition, using Decoder Clock Phase B. A frame signal is generated from PHE A or PHE B.

Each of the decoders 122 and 124 includes a PHE counter (123, 125 in FIG. 8) for counting the number of PHEs. Each of the decoders 122 and 124 outputs the counter value of PHEs. The decoder control unit 126 selects one of the decoders 122 and 124 based on the counts and outputs a select control signal ("A/B Select" in FIG. 8).

The decoding circuit 120 includes a bit counter 128 for counting the number of bits in a frame and outputting a reset signal for resetting the PHE counts in the decoders 122 and 124. Each counter 123, 125 keeps a count of how many PHE signals it has generated, until the reset signal from the bit counter 128 occurs. The PHE counter 123, 125 outputs (PHE Count A and PHE Count B in FIG. 8) represent the number of PHE signals detected in the previous frame for each decoder. The counter information is provided to the decoder control unit 126. For each frame (i.e., the number of bits in a frame have passed), each decoder 122, 124 outputs a count indicating how many PHE's have been detected.

The decoder control unit 126 monitors the two counts (PHE Count A and PHE Count B). The decoder control unit 126 also has a configuration line whereby it may be configured to select either "Decoded Output A" or "Decoded Output B" based on some criteria. The criteria may be, for example but is not limited to, one PHE count being 1 while the other is >1, as an example. In this example, the decoder which outputs a PHE count of 1 is chosen as having the correct phase.

The decoding circuit 120 may include a clock recover for recovering a clock signal and provide the clock with phase A to the decoder A 122 and the clock with phase B to the decoder B 124. The configuration of the clock recover will be well understood by one of ordinarily skill in the art. As described below, the decoding circuit 120 may include a recover for outputting a received clock (2x) that is twice the data rate.

The decoding circuit 120 includes a data Mux 130 and a frame Mux 132. The data Mux 130 selects either Decoded Output A or B, based on the select control signal ("A/B Select") from the decoder control unit 126. The frame Mux 132 selects either PHE A or PHE B, based on the select control signal ("A/B Select") from the decoder control unit 126, to be used as the frame signal. The decoding circuit 120 outputs DECODED_DATA and DECODED_FRAME. The decoder control unit 126 decides which Decoded Output to use and selects the appropriate signals via the data Mux 130 and the frame Mux 132.

One decoder correctly decodes the signal, whereas the other decoder decodes the out-of-phase signal. Ideally, the in-phase decoder will detect a single PHE representing the generated PHE due to the frame signal. The out-of-phase decoder will detect multiple PHE signals for each "101" pattern occurring in the data stream, plus an additional PHE representing the generated PHE due to the frame signal. The output of the PHE counters for each parallel decoder, PHE Count A and PHE Count B in FIG. 8, indicates the correct decoded signal to use one out of the two. The frame signal is extracted from the position of the PHE occurrence.

It is well understood by one of ordinary skill in the art that the above configuration of the decoding circuit is an example only and the decoding circuit can take any other form to recovering the data and frame signal.

Figure 9:
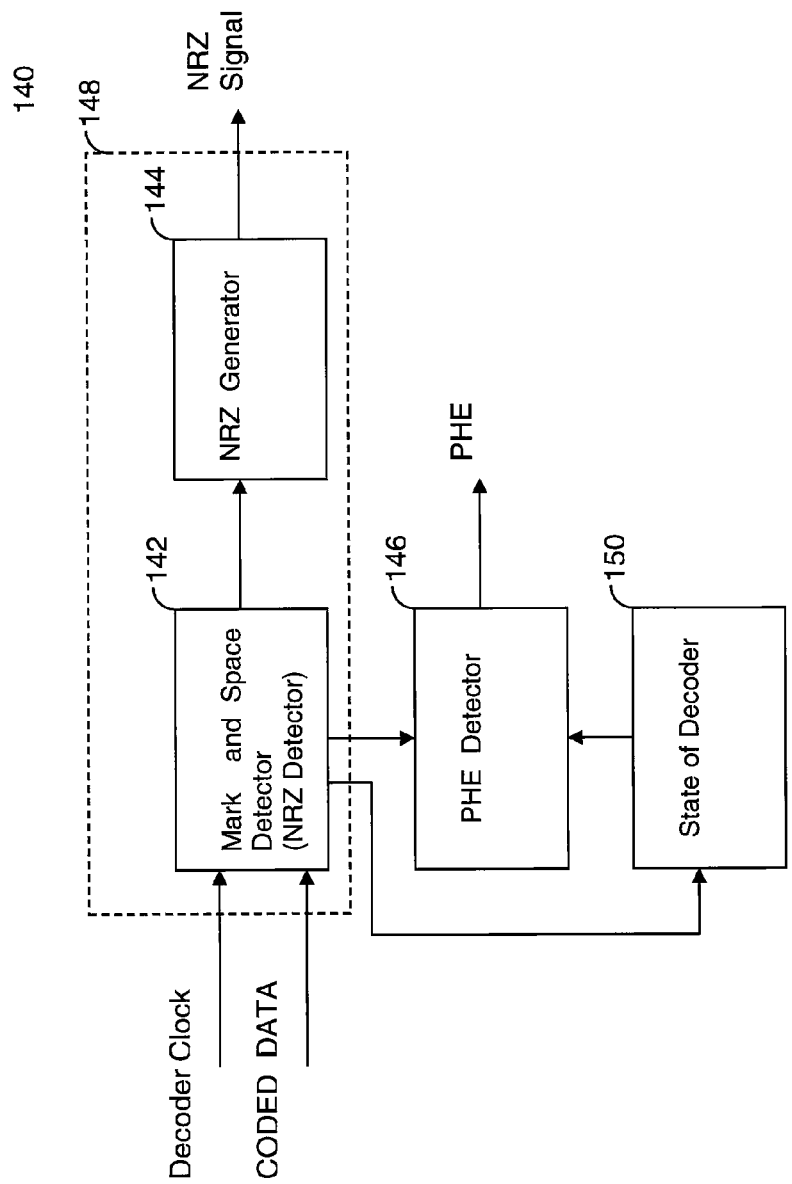
FIG. 9 is a block diagram illustrating an example of the decoder of FIG. 8.

In one example, each of the decoders 122 and 124 includes a mark and space detector 142 (NRZ detector) for detecting if the incoming signal has a mark or space, a NRZ generator 144 for recovering a NRZ signal, and a PHE detector 146 for detecting a PHE, as shown in FIG. 9. The PHE detector 146 may include a circuit for determining if a transition of the decoded data has occurs (e.g., the "00" pattern). The circuits 142 and 144 form a NRZ recover 148. The decoder 140 of FIG. 9 further includes a block 150 for updating a state of the decoder. The PHE detector 146 detects the PHE based on the state of decoder 150 and the output from the mark and space detector 142.

It is well understood by one of ordinary skill in the art that the above configuration of the decoder is an example only and the decoding circuit can take any other form to recovering the data and frame signal.

Figure 10:
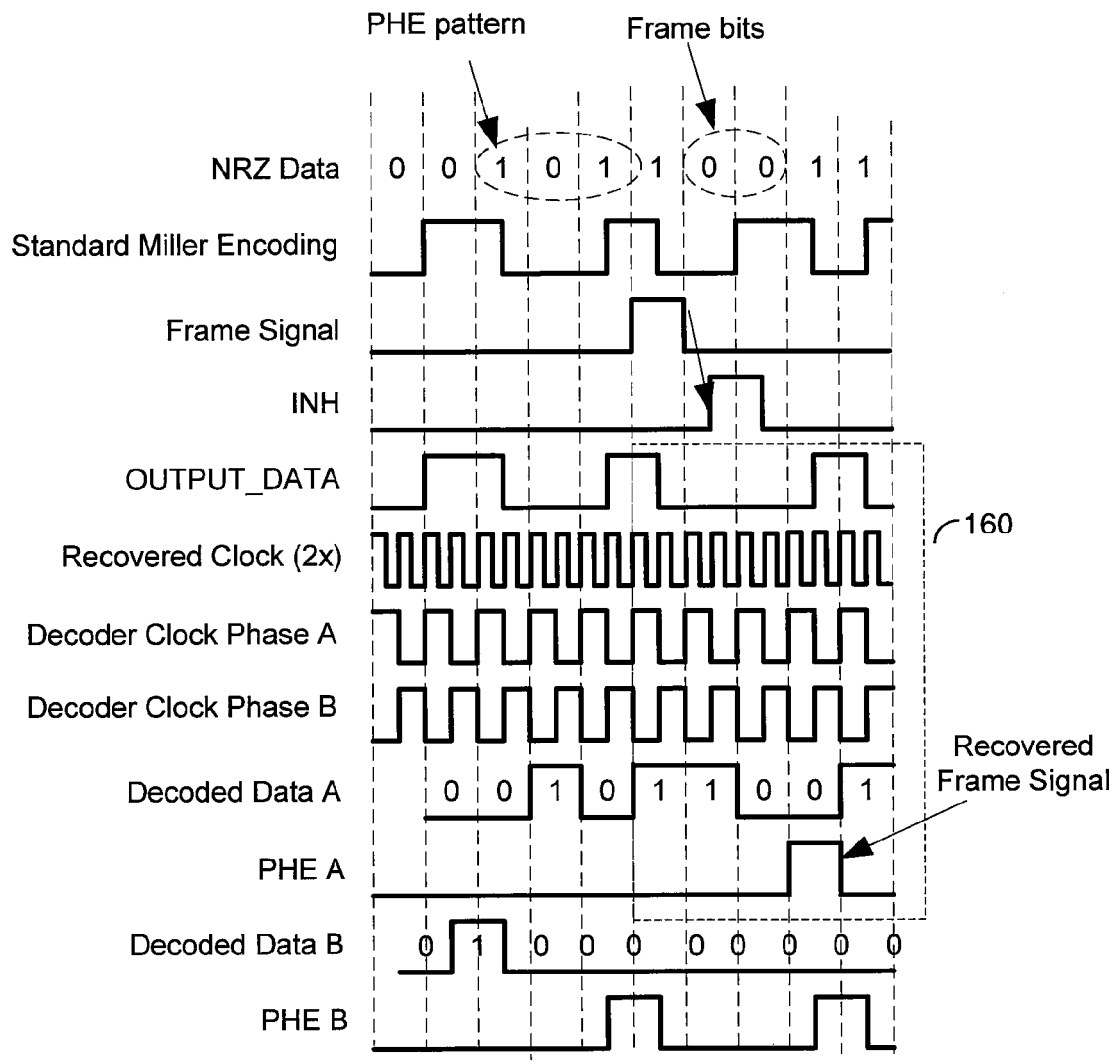
FIG. 10 is a waveform timing diagram illustrating an example of complete encoding and decoding sequences in accordance with an embodiment of the present invention.

FIG. 10 is a waveform timing diagram illustrating an example of complete encoding and decoding sequences in accordance with an embodiment of the present invention. The decoding circuit 120 of FIG. 8 is used for decoding. Referring FIGS. 8 and 10, the NRZ pattern, 0010110011, is to be encoded by the transmitter and subsequently decoded at the receiver. In this example, the NRZ pattern represents one frame of data. Bits are numbered starting from the right with Bit 0, Bit 1, and so forth. Bits 2 and 3 are used for framing purposes and in this NRZ sequence contain the required "00" pattern. The first line shows the NRZ data. The second line shows the standard Miller encoding for the comparison purpose.

"Frame Signal" in FIG. 10 represents the frame signal relative the end of the frame, which is applied to the encoding circuits of the above embodiments. It is noted that the frame signal does not have to occur exactly at the start or the end of the frame. It is sufficient that it occurs in a known relative position to either the start or the end of the frame. In this case the frame signal occurs on bit 4 (numbering starting from the right) of the frame. The control logic (e.g., 12 of FIG. 1, 22 of FIG. 2, 30 of FIG. 3) detects the "00" pattern in the correct position and generates the required INH signal (INH). Thus, the output data (OUTPUT_DATA) is the encoded data with the suppressed transition (compared to the Standard Miller Encoding).

Recovered Clock (2x) in FIG. 10 is a recovered clock that is twice the data rate. "Decoder Clock Phase A" and Decoder Clock Phase B" in FIG. 10 represent relative clock signals for the two decoders 122 and 124 on the decoding circuit 120. The clocks are out of phase with each other. The decoders 122 and 124 are sensitive to the positive edge of their respective clocks. "Decoded Data A" in FIG. 10 represents an output from the decoder A 122 due to detecting marks and spaces based on Decoder Clock Phase A. "Decoded Data B" in FIG. 10 represents an output from the decoder B 124 due to detecting marks and spaces based on Decoder Clock Phase B. "PHE A" in FIG. 10 is the same as that of FIG. 8, which represents a phase error signal when two spaces are detected without an intermediate transition, using Decoder Clock Phase A. "PHE B" in FIG. 10 is the same as that of FIG. 8, which represents a phase error signal when two spaces are detected without an intermediate transition, using Decoder Clock Phase B.

"PHE B" in FIG. 10 shows that two PHEs are detected, one for the "101" pattern and one for the frame signal (the "00" pattern). Once the complete frame has been decoded the counters will indicate that one PHE was detected using the decoder A 122, and two PHEs were detected using the decoder B 124. Therefore, the decoding circuit 120 is able to select the decoder A 122 as the correct decoder. Further, the PHE A signal may be used to generate the recovered frame signal. It is noted that the PHE A signal is delayed relative to the original frame signal. However, this delay is constant and may be compensated for in the receiver.

Figure 11:
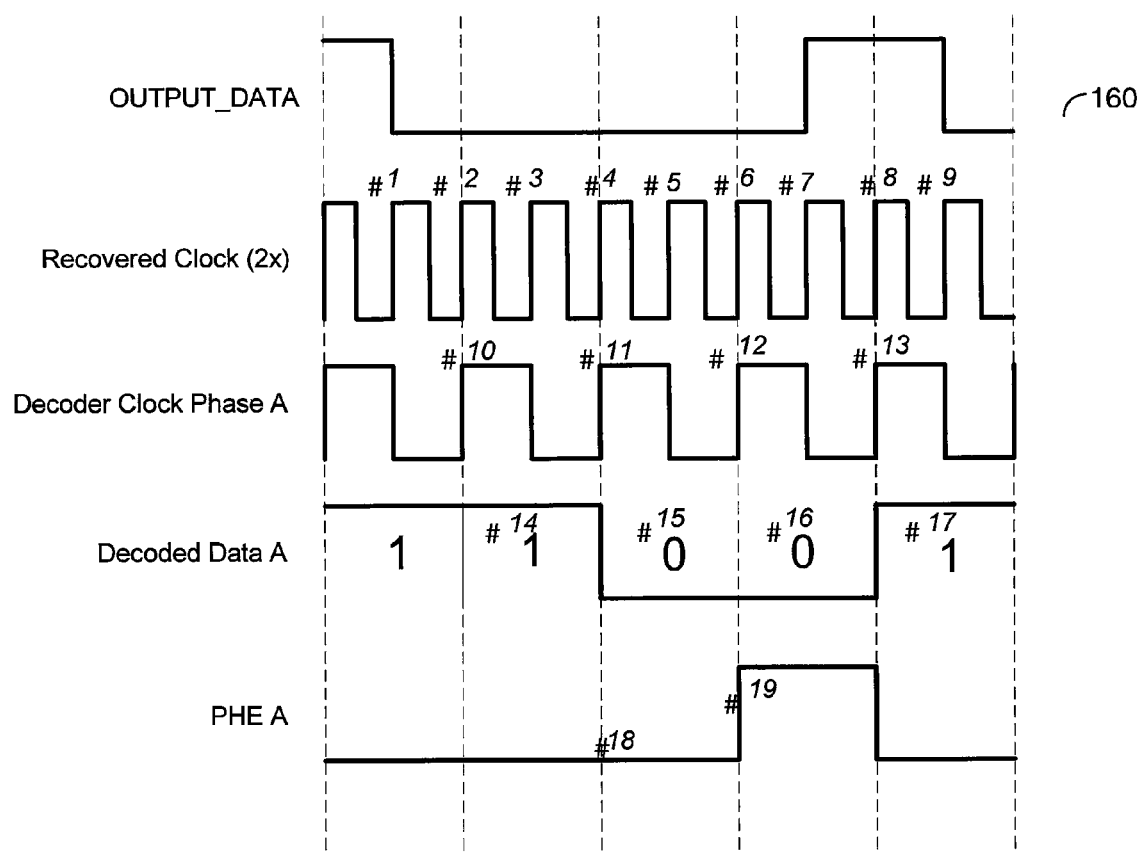
FIG. 11 is a waveform timing diagram illustrating a section of FIG. 10.

The NRZ generation is described in detail with references to FIGS. 8, 9 and 11. FIG. 11 is a waveform timing diagram illustrating the section 160 of FIG. 10, including "OUTPUT_DATA", "Recovered Clock (2×)", "Decoder Clock Phase A", "Decoded Data A" and "PHE A" of FIG. 10. The waveforms of FIG. 11 illustrate the operation of the NRZ recover 148 of FIG. 9. Referring to FIGS. 8, 9 and 11, the output of each decoder 122, 124 is synchronous with its rising edge. For example, for the decoder A 122, the Decoded Data A output changes on the Decoder Clock Phase A rising edges, i.e., #10, #11, #12, #13 in FIG. 11.

The rules for NRZ generation are as follows: When no transition was detected (space detected), its output is a "0". When a transition was detected (mark detected), its output is a "1". On each Decoder Clock Phase A rising edge, the current value of OUTPUT_DATA is compared against the OUTPUT_DATA value as it was at the previous Recovered Clock (2×) rising edge.

1) At rising edge #10, OUTPUT_DATA at #2 is "0", while OUTPUT_DATA at #1 is "1". Mark is detected since they are different, resulting in that the output is a "1". Decoded Data A is "1" (#14).

2) At rising edge #11, OUTPUT_DATA at #4 is "0", while OUTPUT_DATA at #3 is "0". Space is detected since they are the same, resulting in that the output is a "0". Decoded Data A is "0" (#15)

3) At rising edge #12, OUTPUT_DATA at #6 is "0", while OUTPUT_DATA at #5 is "0". Space is detected, resulting in that the output is a "0". Decoded Data A is "0" (#16)

4) At rising edge #13, OUTPUT_DATA at #8 is "1", while OUTPUT_DATA at #7 is "0". Mark is detected, resulting in that the output is a "1". Decoded Data A is "1" (#17).

The above 1)-4) explain the example of the NRZ generation. The same logic applies to Decoded Data B (shown in FIGS. 8 and 10) but the OUTPUT_DATA and previous OUTPUT_DATA are compared at the rising edge of Decoder Clock Phase B (shown in FIG. 10 and not shown in FIG. 11).

The recovery of the frame signal is described in detail with reference to FIGS. 8, 9 and 11. The frame signal is recovered from the PHE signal. The detection of the PHE is as follows. When the NRZ detector 142 has detected a Space, the internal state of the decoder 140 (or 122 and 124 of FIG. 8, 150 in FIG. 9) is updated to indicate that the previous symbol is a Space (call this state of the Decoder 'Space').

The output PHE is dependent on the current state of the decoder 140 and the inputs. When the current state of the decoder 140 indicates that the previous symbol was Mark (call this state of the decoder 'Mark'), there is no PHE generation when the current symbol is a Space.

When the current state of the decoder indicates that the previous symbol was Space (i.e., current state is 'Space'), and the current symbol is a Space, the decoder checks if a transition has occurred. A transition is detected by compared the current value of OUTPUT_DATA to the previous value of OUTPUT_DATA. If they are the same, no transition has occurred. In that case, a PHE is generated. The state of the decoder may remain as 'Space'. If a transition has occurred, the decoder state remains as 'Space' indicating that the previous symbol was a Space, but no PHE is generated.

For example, on edge #11 in FIG. 11, the decoder state is 'Mark' (since the previous symbol was a Mark). The new symbol is a Space. No PHE is generated. The decoder state is updated to indicate the decoder state is 'Space'.

On edge #12 in FIG. 11, the decoder state is 'Space' (since the previous symbol was Space). The new symbol is Space.

Since no transition of OUTPUT_DATA has occurred between Recovered Clock edge #6 and #5, a PHE is generated.

In another embodiment, multiple frame signals are encoded. This may be useful to delimit blocks of data or signify conditions that the receiver may be interested in. The basis of the operation for encoding the multiple frame signals remains the same as previously described. However, the control unit 12 of FIG. 2 is updated to observe 2 or 3 bits for the frame sequence, in one case, looks for three sequential 0s ("000") instead of 2 as described in the previous embodiment. If the first frame signal is asserted, the 2 bits are observed for the frame sequence "00" and according to the control logic as described previously the control until asserts a single INH pulse, inhibiting the transition between the generated spaces in the encoder. If the second frame signal is asserted, 3 bits are observed for the frame sequence (000) and according to the control logic described previously the control unit asserts the INH signal for two transitions, inhibiting the transition between all three spaces in the encoder.

Figures 12A, 12B:
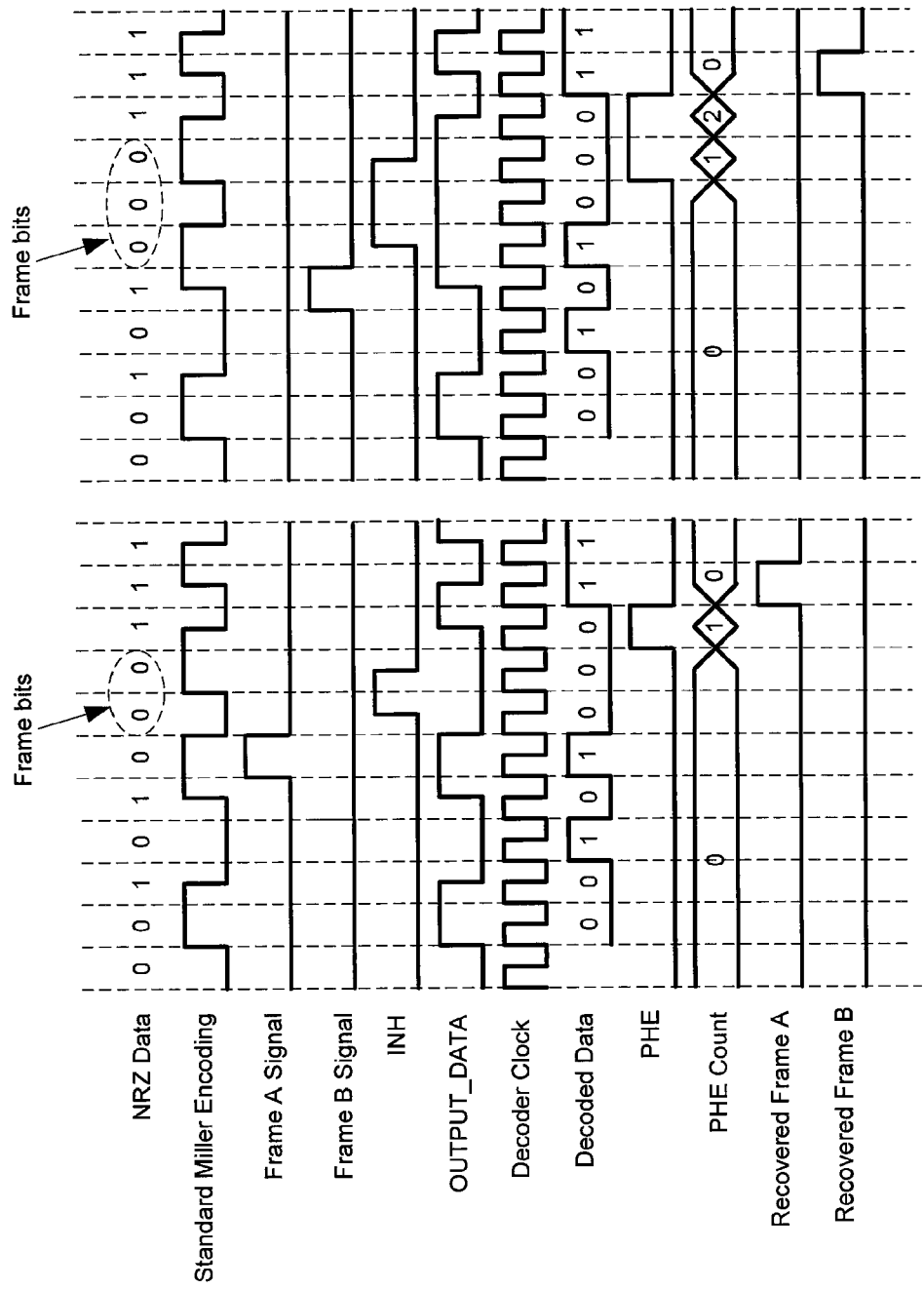
FIGS. 12*a*-12*b* are waveform timing diagrams illustrating examples of a method of encoding multi frame signals in accordance with an embodiment of the present invention.

FIGS. 12a-12b are waveform timing diagrams illustrating examples of a method of encoding multi frame signals in accordance with an embodiment of the present invention. In FIGS. 12a-12b there are two possible frame signals, Frame A Signal, and Frame B signal. In FIG. 12a, Frame A signal is asserted. In FIG. 12b, Frame B signal is asserted.

Line 1 shows the NRZ data. Line 2 shows the standard Miller encoding of the NRZ data for the comparison purpose. Line 3 and Line 4 show the Frame A and Frame B signals, respectively. Line 5 shows the INH signal that is generated for Frame A or Frame B. In FIG. 12b, an INH signal is generated due to Frame B being asserted. In the B case, the control unit (e.g., 22 of FIG. 2) compared 3 NRZ bits to the frame sequence (000). For FIG. 12b, the INH signal inhibits two transitions in the OUTPUT_DATA compared to the standard Miller encoding. Line 6 shows the OUTPUT_DATA output from the encoder (e.g., 14 of FIG. 1, 24 of FIG. 2). Line 7 shows the correct phase decoder clock ("Decoder Clock") on the receiver. Line 8 shows the decoded data according to the rules previously described for a decoder. Line 9 shows the PHE signal when a phase error is detected. In FIG. 12b, Line 9, the PHE signal is two bits wide since the phase error consists of three spaces without any intermediate transitions. Line 10 shows a PHE count that represents the length of the PHE pulse. In FIG. 12a, Line 10, the PHE count is 1. In FIG. 12b, the PHE count is "2". The value of the count immediately preceding when the count resets to 0 indicates the recovered frame signal. In FIG. 12a, the count reaches 1, thus the recovered frame signal is Recovered Frame A (Line 11). In FIG. 12b, the count reaches "2", thus the recovered frame signal is Recovered Frame B (Line 12).

In a further embodiment, n frame signals may be encoded by extending the control unit (e.g., 22 of FIG. 2) to observe an appropriate number of bits. The control unit generates an appropriately sized INH signal to inhibit multiple transitions between spaces representing the encoding of Frame n. The decoder is able to distinguish between multiple frames by observing the length of the PHE signal through a counter or some other means, and generate the appropriate recovered frame signal. In a similar fashion as described previously for the control unit, the control unit may be configured to force bits to generate the required sequence based on some minimum frequency.

Conventional data transfer systems either use multiple wires or channels to transmit the bit clock and or frame signal in parallel with data to be transmitted. These methods use two or three times the bandwidth of the data alone. Using line coding the bit clock may be incorporated within the data signal. In such systems, a preamble or other escape sequence is used to allow the receiver to establish a reference frame signal to delimit the frames within the data. However, the preamble uses some of the bandwidth that may otherwise be allocated towards useful data. By contrast according to the embodiments of the present invention, the frame signal is incorporated within the data signal (in addition to the clock signal). Thus, the bandwidth overhead is eliminated. In addition, multiple frame signals can be incorporated with the data signal.

One or more currently preferred embodiments have been described above by way of example. It will be apparent to persons skilled in the art that a number of variations and modifications can be made without departing from the scope of the invention as defined in the claims.

What is claimed is:

1. A method for digital data communication, comprising:
   encoding a frame signal into a bit stream, including:
      detecting a specific bit pattern in the bit stream when the frame signal is present;
      generating a control signal in respect to the specific bit pattern; and
      encoding the bit stream into one or more marks and one or more spaces, so that encoded data include a unique encoding pattern for the frame signal in response to the control signal.

2. A method as claimed in claim 1, wherein the step of encoding comprises:
   modifying the bit stream based on a criteria to force the bit stream to contain the specific bit pattern.

3. A method as claimed in claim 2, wherein the step of modifying comprises at least one of:
   implementing inline modification so that the length of the bit stream is unchanged; and
   toggling one or more bits to force the bit stream to contain the specific bit pattern.

4. A method as claimed in claim 2, comprising:
   counting, at a counter, the number of frames in which the specific bit pattern is not detected, the step of modifying being implemented when the counter reaches a threshold.

5. A method as claimed in claim 1, wherein the step of encoding comprises:
   inhibiting a transition in a Miller encoding, based on the control signal.

6. A method as claimed in claim 1, wherein the specific bit pattern comprises a series of bits, each having a logic value.

7. A method as claimed in claim 1, wherein the specific bit pattern is n bits long, wherein n is an integer greater than 1, and the number of frame signals to encode is n−1.

8. A method as claimed in claim 1, further comprising:
   decoding the encoded data, including:
      recovering the bit stream from the encoded data; and
      recovering the frame signal from the encoded data by detecting a pattern associated with the unique encoding pattern.

9. A method as claimed in claim 1, wherein the step of generating comprises:
   generating the control signal for triggering a code violation when the encoded data is decoded.

10. A system for digital data communication comprises:
    an encoding circuit including:
       a control unit for detecting a specific bit pattern in an incoming bit stream at a bit position relative to a frame signal and asserting a control signal in respect to the specific bit pattern; and
       a mark and space unit for encoding the bit stream into one or more marks and one or more spaces so that the frame signal is embedded into encoded data, in response to the control signal.

11. A system as claimed in claim 10, wherein the bit stream includes digital bits having logic values of 0 and 1, and wherein the mark and space unit employs a Miller encoding with the definition of 0 and 1 or a Miller encoding with the definition of 0 and 1 reversed.

12. A system as claimed in claim 11, wherein the specific bit pattern comprises a series of bits, each having a logic value.

13. A system as claimed in claim 11, wherein the specific bit pattern is n bits long, wherein n is an integer greater than 1, and the number of frame signals to encode is n−1.

14. A system as claimed in claim 10, wherein the control unit comprises a state machine for controlling the operation of the control unit.

15. A system as claimed in claim 10, wherein the control unit comprises:
    a circuit for modifying the bit stream based on at least one of a state and configuration of the control unit to force the bit stream to contain the specific bit pattern.

16. A system as claimed in claim 15, wherein the circuit for modifying implements inline modification so that the length of the bit stream is unchanged, toggling one or more bits to force the bit stream to contain the specific bit pattern, or a combination thereof.

17. A system as claimed in claim 15, wherein the control unit comprises:
    a counter for counting the number of frames in which the specific bit pattern is not detected, the control unit implements modification of the bit stream based on the output of the counter.

18. A system as claimed in claim 10, wherein the control unit comprises:
    a circuit for generating the control signal for inhibiting a transition in a Miller encoding.

19. A system as claimed in claim 18, wherein the circuit for generating the control signal generates the control signal for triggering a code violation when the encoded data is decoded.

20. A system as claimed in claim 10, further comprising:
    a decoder including:
       a recover for recovering the bit stream from the encoded data; and
       a recover for recovering the frame signal from the encoded data.

21. A method for decoding comprising:
    detecting at least one of mark and space from encoded data;
    recovering a bit stream from the encoded data when the at least one of mark and space is present;
    detecting a specific bit pattern associating with a frame signal from the encoded data when the at least one of mark and space is present; and
    recovering the frame signal from the encoded data based on the specific bit pattern.

22. A method as claimed in claim 21, further comprising:
    providing a decoder clock with a first phase to recover the bit stream and the frame signal;
    providing a decoder clock with a second phase to recover the bit stream and the frame signal; and
    selecting either the bit stream and the frame signal recovered by using the decoder clock with the first phase, or the bit stream and the frame signal recovered by using the decoder clock with the second phase.

23. A system for decoding comprising:
a first decoder including:
  a circuit for detecting at least one of mark and space from encoded data;
  a first recover for recovering a bit stream from the encoded data when the at least one of mark and space is present;
  a circuit for detecting a specific bit pattern associating with a frame signal from the encoded data when the at least one of mark and space is present; and
  a second recover for recovering the frame signal based on the specific bit pattern.

24. A system as claimed in claim 23, further comprising:
a second decoder corresponding to the first decoder, and
a circuit for selecting one of the outputs from the first decoder and the second decoder,
  the first decoder and the second decoder receiving the encoded data, the first decoder and the second decoder using decoder clocks with different phases.

* * * * *